June 12, 1951  J. B. IRWIN  2,556,652
HANDLING APPARATUS FOR TRACTION WHEELS AND
DRIVING UNITS THEREFOR
Filed Aug. 24, 1945  4 Sheets-Sheet 1

INVENTOR.
JAMES B. IRWIN
BY *Victor J. Evans & Co.*
ATTORNEYS

June 12, 1951   J. B. IRWIN   2,556,652
HANDLING APPARATUS FOR TRACTION WHEELS AND
DRIVING UNITS THEREFOR Filed Aug. 24, 1945   4 Sheets-Sheet 2

INVENTOR.
JAMES B. IRWIN
BY *Victor J. Evans & Co.*
ATTORNEYS

June 12, 1951     J. B. IRWIN     2,556,652
HANDLING APPARATUS FOR TRACTION WHEELS AND
DRIVING UNITS THEREFOR Filed Aug. 24, 1945     4 Sheets-Sheet 3

INVENTOR.
JAMES B. IRWIN
BY *Victor J. Evans & Co.*
ATTORNEYS

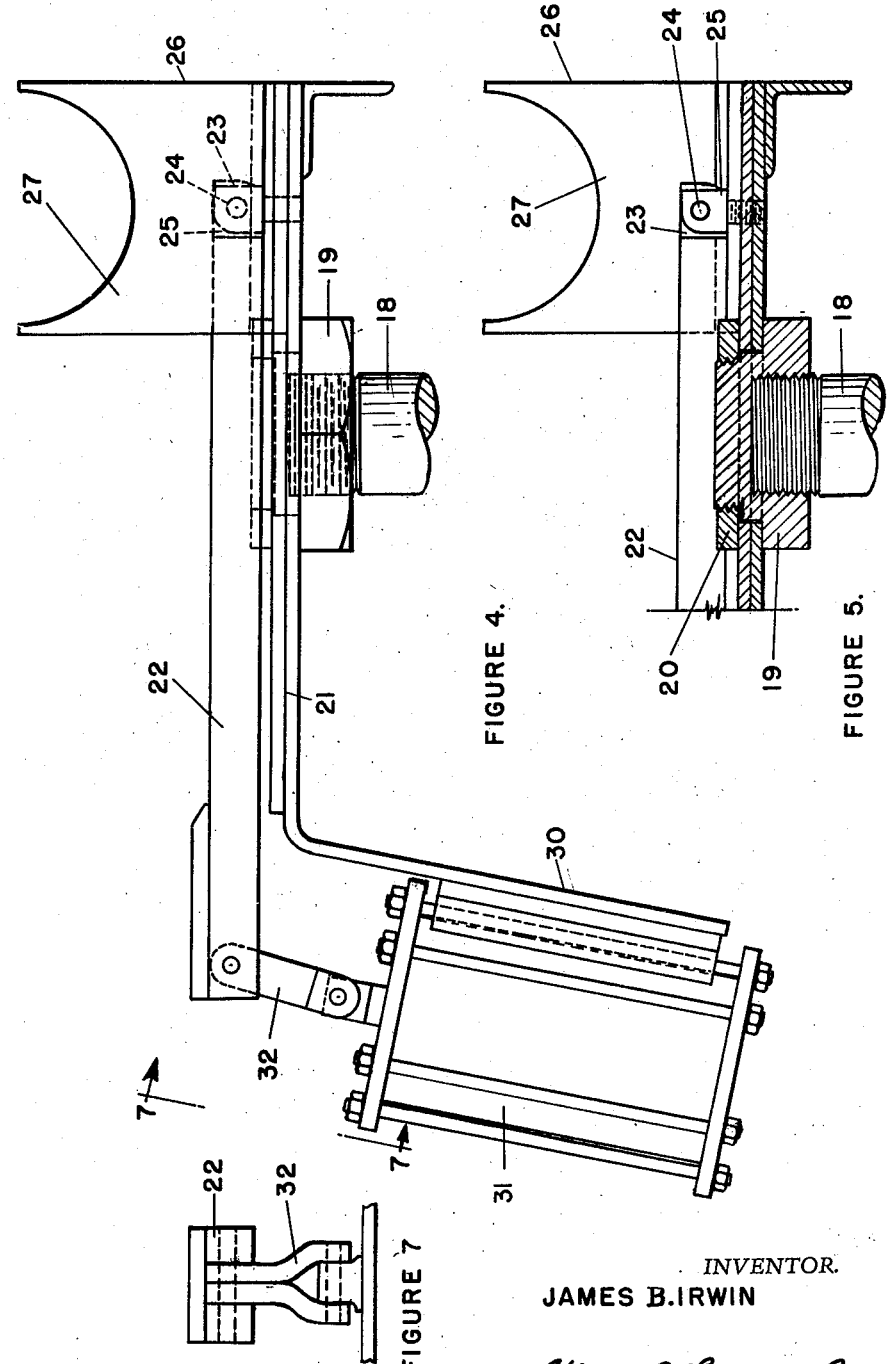

Patented June 12, 1951

2,556,652

UNITED STATES PATENT OFFICE 2,556,652

HANDLING APPARATUS FOR TRACTION WHEELS AND DRIVING UNITS THEREFOR

James B. Irwin, Denver, Colo.

Application August 24, 1945, Serial No. 612,371

5 Claims. (Cl. 104—32)

1

The invention relates to handling apparatus for traction wheels and driving units therefor, and more especially to a jack for Diesel, electric, gas or other power propelled units or locomotives, for the removal and replacement of traction wheels and motors from and to the same.

The primary object of the invention is the provision of a jack of this character, wherein safe placement and removal of the motive units and traction wheels to and from the truck of self-propelled vehicle can be had with dispatch and economically, with a minimum of manpower, the jack in its entirety being of novel construction and unique in the working thereof.

Another object of the invention is the provision of a jack of this character, wherein the traction wheels with driving unit can be tilted after the raising thereof or otherwise, so that the recess in the unit case will enter the unit suspension bracket on the vehicle truck, for placement in proper position, this functioning being effected automatically through the use of the said jack.

A further object of the invention is the provision of a jack of this character, wherein it is operated within a pit beneath a runway for the vehicle, with ease and dispatch, the jack being shiftable to the desired working position, for the convenient placement or removal of the traction wheels and propelling unit thereof, to and from the truck of such vehicle.

A still further object of the invention is the provision of a jack of this character, which is simple in construction, thoroughly reliable and efficient in operation, strong, durable, readily and easily handled, it being automatic in the working thereof, and inexpensive to manufacture and install.

With these and other objects in view, the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 4 is a fragmentary enlarged side elevation of the adjusting head of the jack;

Figure 5 is a sectional view taken on the line

2

Figure 1:
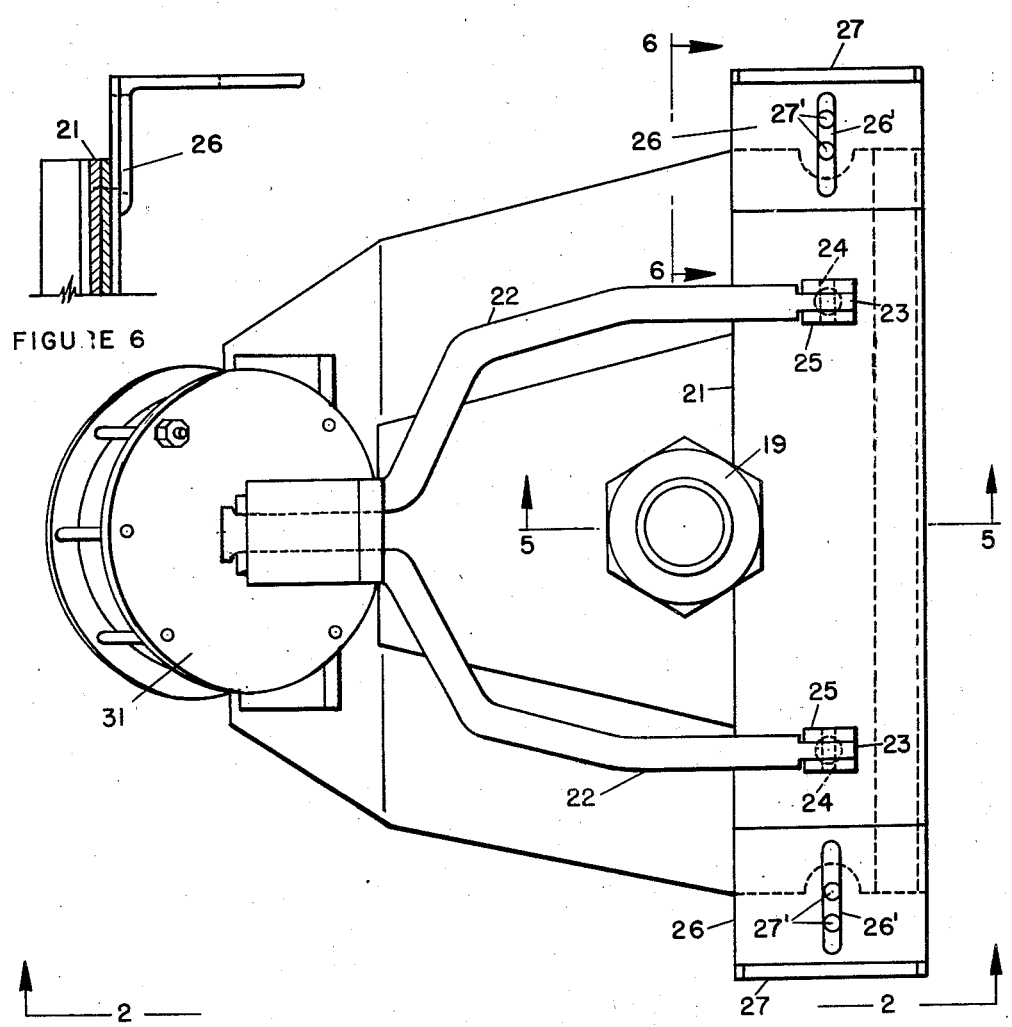
Figure 1 is a top plan view of the jack constructed in accordance with the invention.

5—5 of Figure 1 looking in the direction of the arrows;

Figure 6 is a fragmentary sectional view taken on the line 6—6 of Figure 1 looking in the direction of the arrows;

Figure 7 is a fragmentary sectional view taken on the line 7—7 of Figure 4 looking in the direction of the arrows.

Similar reference characters indicate corresponding parts throughout the several views in the drawings.

Referring to the drawings in detail, A designates schematically a foundation pit or well, bridged by railway track rails 10 at the surface of the foundation, which is common in roundhouses or other railway equipment shops or the like. The floor of the pit or well A has built thereon track rails 11, which in this instance are arranged crosswise to the lay of the track 10 above the same. Above the pit or well A in dotted outline at 12 in Figure 3 of the drawings is shown a portion of a self-propelled vehicle, that is to say, its truck, which may be equiped with a driving unit, not shown, of Diesel, electric or gas type, its casing 13 being adapted for interfitting a suspension bracket 14 on the truck 12 for the carrying of such unit in proper position thereon. This unit operates the traction wheels, one of which is indicated at 15 for the propelling of the vehicle, and the latter with its truck 12, casing 13 and bracket 14 and other adjuncts thereto form no part of the present invention, they being merely illustrated for an understanding of the operation of the jack constituting the present invention and hereinafter described in detail.

The jack constructed in accordance with the invention, comprises an upstanding hydraulically operated raising and lowering device designated generally at B, and can be corresponding to any conventional, hydraulically actuated drop pit jack construction, movably supported by a carriage 16, its traction wheels 17 adapted to travel on the track rails 11 to bring it into the required position within the pit or well A. The raising and lowering stem or ram 18 of this jack device B operates in a vertical direction, and at its upper end is fitted a bushing 19, which through a bushing nut 20 is coupled with a head 21, horizontally disposed, and of the desired shape, it being of sheet or plate metal formation.

Figure 2:
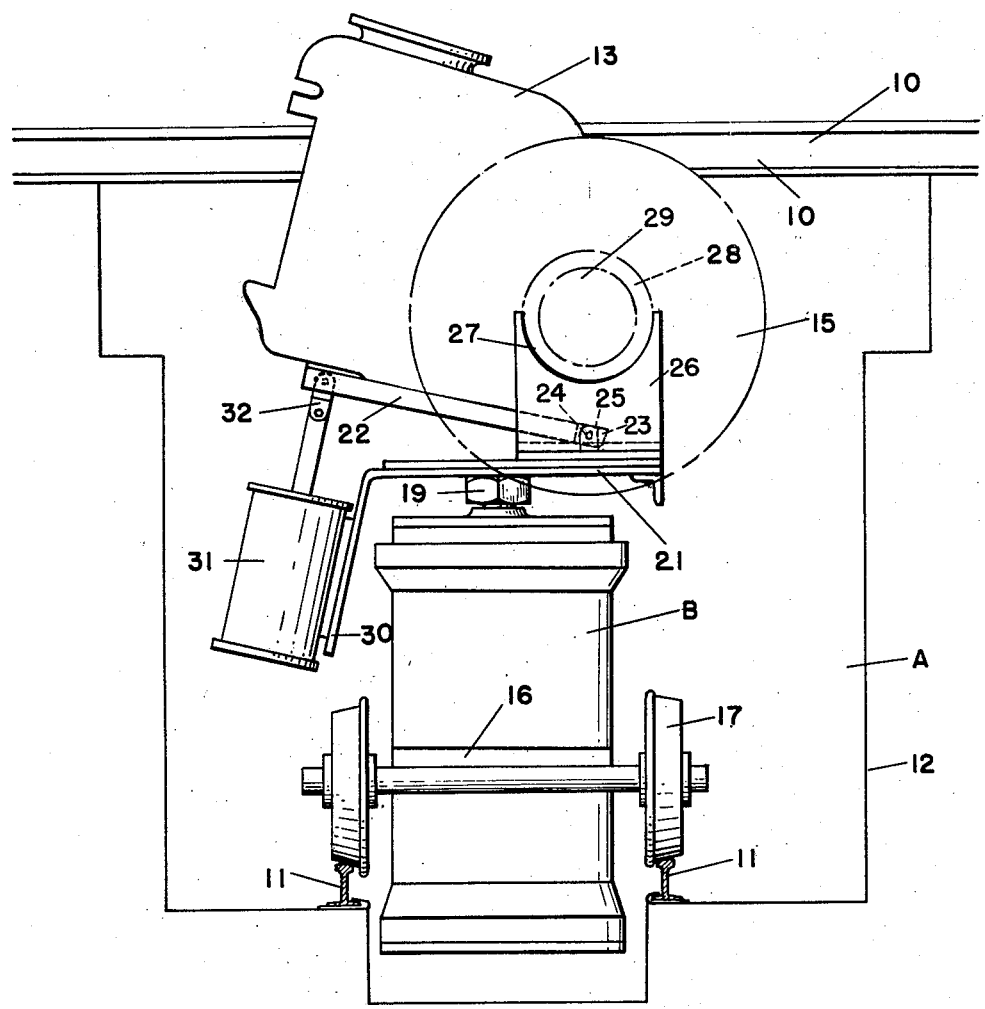
Figure 2 is a side view thereof on the line 2—2 of Figure 1.
Figure 3:
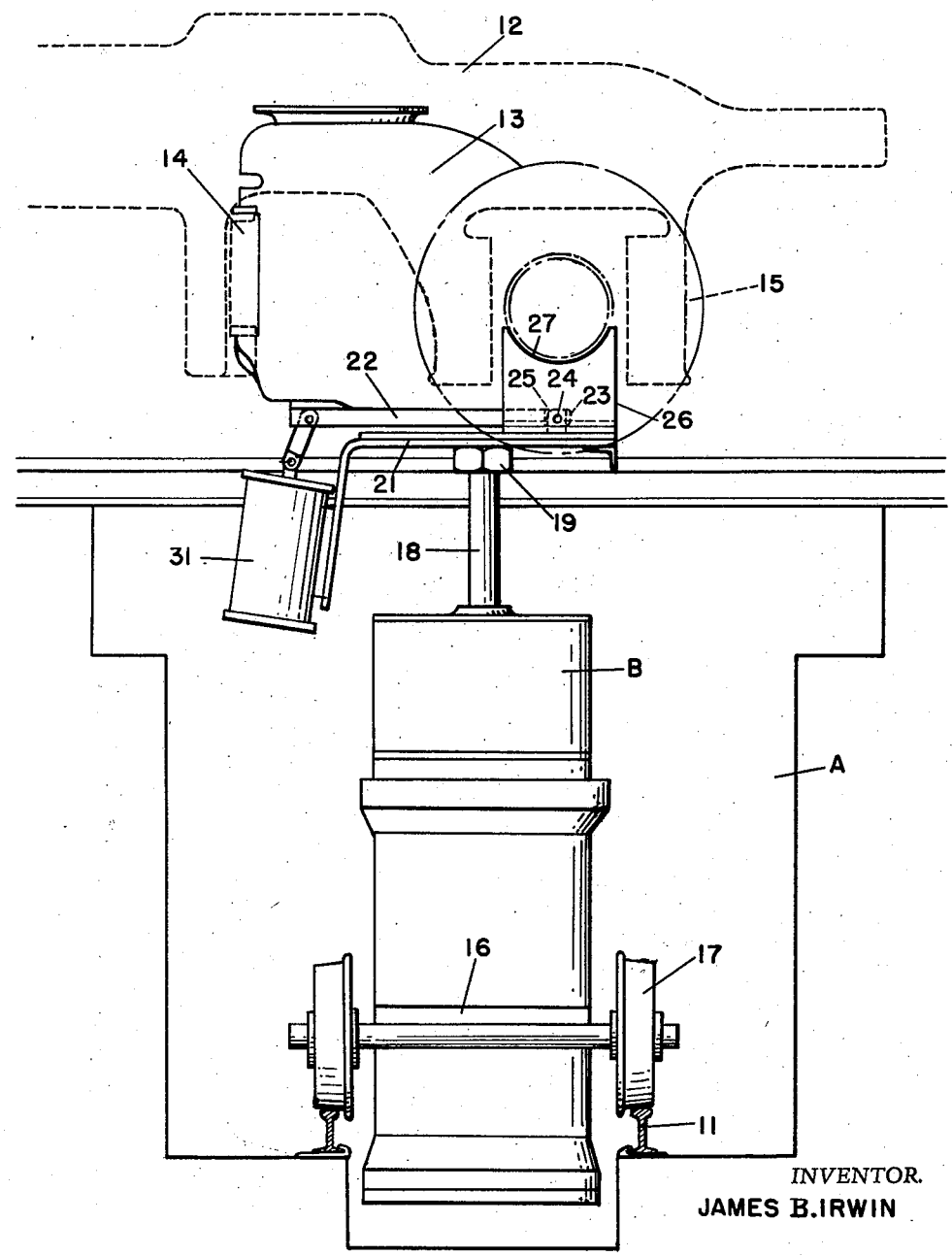
Figure 3 is a view similar to Figure 2 with the jack in a raised position for placement purposes, the jack in Figure 2 being in a lowered position for removal purposes.

Above and supported by this head 21 is a vertically swinging tiltable stirrup or yoke 22 which at the arm terminals 23 has hinge connections 24 with upright bearings 25 fitted to the head 21. Next to the arm terminals 23 and carried by the head 21 are journal racks 26 providing saddles provided with seats 27 for accommodating the collar on the brass bearing 28 of the wheel axle 29 for the traction wheels of the vehicle, as best seen in Figures 2 and 3 of the drawings. The journal racks 26 are adjustable laterally with relation to the head 21 by means of the elongated slots 26' therein. Bolts 27' engage the head 21 and the slots 26' for the retention of the journal racks 26 on the head 21 as best seen in Figure 1.

The head 21 remote from the saddles or racks 26 is formed with a downwardly inclined flange 30 to which is fixed a hydraulically operated tilting element 31 having linkage at 32 to the stirrup or yoke 22 for the tilting of the same. The hydraulic operation of the element 31 is had in any suitable manner, this being also true with respect to the raising and lowering device B.

In the use of the jack constituting the present invention, the vehicle to be operated upon is brought over the pit or well A to the position shown in Figure 3 of the drawings, whereupon the said jack is raised to have the truck wheels axle engage the saddles or racks 26 for settlement in the seats 27 therein, and the casing 13 to rest on the stirrup or yoke 22, the jack being susceptible of raising or lowering a fraction of an inch at a time, and when the casing 13 is uncoupled from the bracket 14, the jack is lowered and concurrently therewith the stirrup or yoke 22 will be tilted, thus removing the casing 13 from the bracket 14 and the casing and traction wheels, from the truck of the vehicle, as is indicated in Figure 2 of the drawings. In reverse action, the tilting of the yoke 22 will properly aline the casing 13 with the bracket 14.

In Figure 3 of the drawings, there is disclosed a reversal of action of the jack for the placement of the casing 13 in the bracket 14, together with the traction wheels 15 in association therewith to the vehicle truck 12, and in this functioning the tilting of the casing of the motor unit will bring that recess therein in position to enter the suspension bracket for such casing, and thus carried into proper position for secure mounting.

What is claimed is:

1. An apparatus of the kind described, comprising a hydraulically controlled raising and lowering jack having a vertically movable ram, a head carried by the ram, a stirrup pivoted at one end on the head and adapted to swing in a vertical plane, a saddle rising from the head adjacent the pivoted end of the stirrup and having seats, a downwardly inclined flange on said head and means mounted on said flange and hydraulically controlled for swinging the stirrup in the direction of the saddle.

2. An apparatus of the kind described, comprising a hydraulically controlled raising and lowering jack having a vertically movable ram, a head carried by the ram, a stirrup pivoted at one end on the head and adapted to swing in a vertical plane, a saddle rising from the head adjacent the pivoted end of the stirrup and having seats, a downwardly inclined flange on said head, means mounted on said flange and hydraulically controlled for swinging the stirrup in the direction of the saddle, and means on said head coacting with means on said saddle for laterally adjusting said saddle in relation to said head.

3. An apparatus of the kind described, comprising a hydraulically controlled raising and lowering jack having a vertically movable ram, a head carried by the ram, a stirrup pivoted at one end on the head and adapted to swing in a vertical plane, a saddle rising from the head adjacent the pivoted end of the stirrup and having seats, a downwardly inclined flange on said head, means mounted on said flange and hydraulically controlled for swinging the stirrup in the direction of the saddle, means for adjusting the saddle and a movable carriage for the jack.

4. An apparatus of the kind described, comprising a hydraulically controlled raising and lowering jack having a vertically movable ram, a head carried by the ram, a stirrup pivoted at one end on the head and adapted to swing in a vertical plane, a saddle rising from the head adjacent the pivoted end of the stirrup and having seats, a downwardly inclined flange on said head, means mounted on said flange and hydraulically controlled for swinging the stirrup in the direction of the saddle, means for adjusting the saddle, a movable carriage for the jack and a trackage for the carriage.

5. An apparatus of the kind described, comprising a hydraulically controlled raising and lowering jack having a vertically movable ram, a head carried by the ram, a stirrup pivoted at one end on the head and adapted to swing in a vertical plane, a saddle rising from the head adjacent the pivoted end of the stirrup and having seats, a downwardly inclined flange on said head, means mounted on said flange and hydraulically controlled for swinging the stirrup in the direction of the saddle, means on said head coacting with means on said saddle for laterally adjusting said saddle in relation to said head, a movable carriage for the jack, a trackage for the carriage and said stirrup comprises a yoke which when moved by said hydraulically controlled means will guide work carried by the head stirrup and saddle.

JAMES B. IRWIN.

REFERENCES CITED

The following references are of record in the file of this patent:

UNITED STATES PATENTS

| Number | Name | Date |
| --- | --- | --- |
| 1,163,105 | Pamplin et al. | Dec. 7, 1915 |
| 1,387,544 | Hibbard | Aug. 16, 1921 |
| 1,431,939 | Eaton | Oct. 17, 1922 |
| 1,843,852 | Troy | Feb. 2, 1932 |
| 2,181,163 | Akins | Nov. 23, 1939 |